April 7, 1936.  L. P. CROSMAN  2,036,400
CLUTCH
Filed April 30, 1935

INVENTOR
Loring P. Crosman
BY
Stuart Wilder ATTORNEY

Patented Apr. 7, 1936

2,036,400

UNITED STATES PATENT OFFICE 2,036,400

CLUTCH

Loring Pickering Crosman, Maplewood, N. J., assignor to Gardner Company, Orange, N. J., a corporation of Delaware Application April 30, 1935, Serial No. 18,993

6 Claims. (Cl. 192—149)

The invention has relation to clutches for use in various forms of power driven mechanism, and it consists in the novel construction and combination of parts, as set forth in the appended claims.

Figure 1:
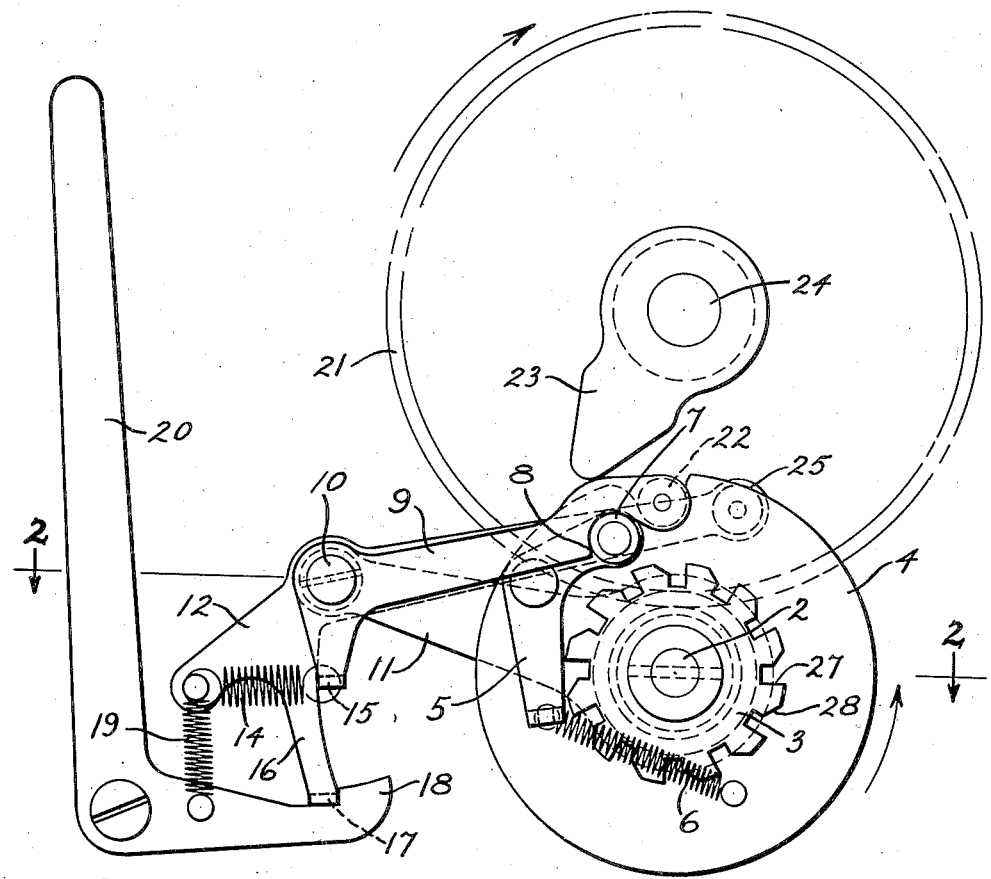

In the accompanying drawing illustrating the invention:

Fig. 1 is a side elevation of a clutch mechanism constructed in accordance with the invention.

Figure 2:
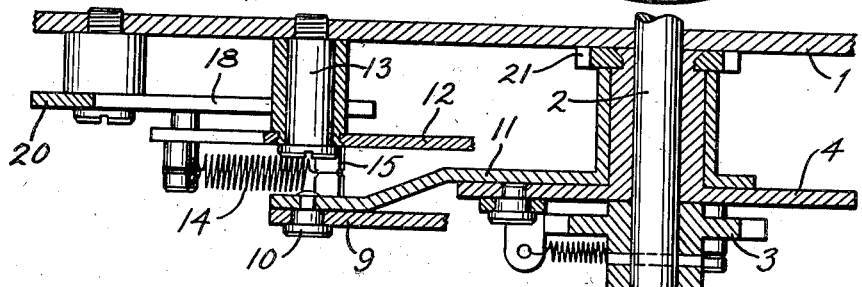

Fig. 2 i a section of the same, taken on line 2—2 of Fig. 1.

In the drawing the numeral 1 designates a stationary frame in which the drive shaft 2 is mounted. The driving member 3 of the clutch is fixed upon shaft 2, and comprises a disc having radial teeth hereinafter more fully described. The driven member 4 of the clutch comprises a notched disc, loosely mounted upon the shaft 2 and having a pawl 5 pivoted thereupon, said pawl being urged by a spring 6 into clutching position between the teeth of the driving member 3.

The clutch is normally held out of engagement by contact of a roller 7 of the pawl 5 with a shoulder 8 of a floating abutment arm 9, said arm being pivoted at 10 upon an arm 11 mounted in concentric relation to the clutch members.

The abutment member 9 is controlled by a spring-urged lever 12, fulcrumed to the frame 1 at 13, a spring 14 normally holding a lug 15 of arm 9 against a lower extension 16 of said lever. In the normal position of the parts, a lug 17 of the extension 16 is engaged by a latch 18, held in engagement by a spring 19, and having an extension 20 forming a trip lever by which the latch may be released and the clutch engaged in the following manner:

Clockwise rotation of lever 20 will free lug 17 from latch 18, and will also tension the spring 19, which is secured at its upper end on a stud of lever 12. Lever 12 will therefore rock counterclockwise about fulcrum 13, the extension 16, through its contact with lug 15, also acting to lift the abutment arm 9, so as to move the shoulder 8 out of contact with roller 7. Thereupon, a spring 6 will move pawl 5 into engagement between the teeth of the driving member 3, and movement will be imparted from shaft 2 and member 3, through pawl 5 to the driven member 4, and thereby to gearing 21 or other suitable driven parts. The rotation of the driven clutch member or disc 4 will carry the notch of said disc out of register with a roller 22 mounted in the end of arm 9, the peripheral portion of disc 4 preventing return movement of arm 9 until a full cycle of rotation of shaft 2 has brought the notch of the disc again opposite roller 22.

Assuming that the operator has released lever 20 before the arrival of the notched disc 4 opposite roller 22, a relatching tooth 23 mounted upon driven shaft 24 will contact with a roller 25, mounted upon the end of lever 12, rocking said lever clockwise about fulcrum 13, relieving the lug 15 of pressure from extension 16, and tensioning spring 14 to return arm 9 to normal position. At the same time the lug 17 of extension 16 will be reengaged with the latch 18. Thereupon roller 22 of arm 9 will move down a cam wall of the notch of disc 4, under pressure of spring 14, moving the driven member 4 forwardly with relation to the driving member 3, thereby relieving pawl 5 of the excessive friction due to the driving contact thereof with the teeth of disc 3.

Finally, as roller 22 reaches the bottom of the slot, roller 7 of pawl 5 will contact with the shoulder 8 of abutment arm 9, to rock the pawl out of contact with the teeth of disc 3 and bring the disengaged driven parts to rest.

The inertia of these driven parts will be taken up by the spring 14, which now acts as a cushion spring, allowing a certain degree of counterclockwise rotation of the arms 9 and 11, and restoring them to normal position by the centralizing action of the spring connection. This will serve to locate the driven parts accurately in their position of rest.

The relieving of the clutch parts from driving friction during the disengaging action enables the teeth of disc 3 to be made of considerable depth, and the engaging portion of the pawl to be quite broad, giving a secure clutching engagement and a sturdy construction of parts. It also enables the teeth in disc 3 to be made each with a plane substantially radial forward face 27, and with a chamfered trailing face 28, providing for close engagement of the end of pawl 5 within a right angle notch between the teeth.

I claim:

1. In a clutch, the combination with driving and driven members, a pawl mounted upon the driven member, and a spring adapted to engage said pawl with the driving member; of a floating abutment arm movable into the path of movement of said pawl, and a centralizing spring adapted to resist movement of said arm in either of two directions by the driven member.

2. In a clutch, the combination with a stationary frame, driving and driven members mounted thereon, a pawl mounted upon the driven member, and a spring adapted to engage said pawl with the driving member; of an arm pivoted concentrically of the clutch members, an abutment arm pivotally mounted upon said concentrically pivoted arm and movable into the path of movement of said pawl, and a spring device connecting said arms with the stationary frame.

3. In a clutch, the combination with driving and driven members, a pawl mounted upon the driven member, and a spring adapted to engage said pawl with the driving member; of a floating abutment arm movable into the path of movement of said pawl, a spring adapted to resist movement of said arm by the pawl, a spring urged lever adapted to move the abutment arm away from the pawl, a latch for said lever, and a trip lever for said latch.

4. In a clutch, the combination with driving and driven members, a pawl mounted upon the driven member, and a spring adapted to engage said pawl with the driving member; of a floating abutment arm movable into the path of movement of said pawl, a spring adapted to resist movement of said arm by the pawl, a spring-urged lever adapted to move the abutment arm away from the pawl, a latch for said lever, a trip lever for said latch, and a relatching tooth driven by said driven clutch member and engageable with the spring-urged lever.

5. In a clutch, the combination with a driving member, a driven member comprising a disc provided with a cam walled notch, a pawl mounted upon the driven member, and a spring adapted to engage said pawl with the driving member; of an abutment arm, engaging the periphery of the notched disc and having a shoulder movable into the path of movement of said pawl, and a spring adapted to move the abutment arm against the cam wall of said notch, to advance the disc relatively to the driving member.

6. In a clutch, the combination with a driving member, a driven member comprising a disc provided with a cam walled notch, a pawl mounted upon the driven member, and a spring adapted to engage said pawl with the driving member; of a floating abutment arm engaging the periphery of the notched disc and having a shoulder movable into the path of movement of said pawl, and a spring adapted to move the abutment arm against the cam wall of said notch, to advance the disc relatively to the driving member and further adapted to resist movement of said arm by the pawl.

LORING PICKERING CROSMAN.